G. E. PURPLE.
BELT FASTENING.
APPLICATION FILED JAN. 10, 1913.

1,092,859.                                  Patented Apr. 14, 1914.

Witnesses:
Fred Palm
Chas. L. Goss

Inventor:
George E. Purple
By Flanders Bateman Laworth Bateman
Attorneys.

UNITED STATES PATENT OFFICE.

GEORGE E. PURPLE, OF LA GRANGE, ILLINOIS, ASSIGNOR TO FLEXIBLE STEEL LACING COMPANY, OF CHICAGO, ILLINOIS, A CORPORATION OF ILLINOIS.

BELT-FASTENING.

1,092,859. Specification of Letters Patent. Patented Apr. 14, 1914.

Application filed January 10, 1913. Serial No. 741,228.

*To all whom it may concern:*

Be it known that I, GEORGE E. PURPLE, a citizen of the United States, residing at La Grange, in the county of Cook and State of Illinois, have invented certain new and useful Improvements in Belt-Fastenings, of which the following is a specification, reference being had to the accompanying drawing, forming a part thereof.

This invention relates more particularly to hinged metallic fastenings for machinery belting. Its main objects are in the construction of the fastening members from sheet metal, to provide for the attachment of the hinge loops to the outer sides only of the belt ends and thus avoid contact of metal attachments with the pulleys on which the belt runs, and the wear and noise incident to such contact, and generally to improve the construction of this class of fastenings and facilitate their attachment to belts.

It consists in the construction, arrangement and combination of parts as hereinafter particularly described and pointed out in the claims.

In the accompanying drawing like characters designate the same parts in the several figures.

Figure 1:
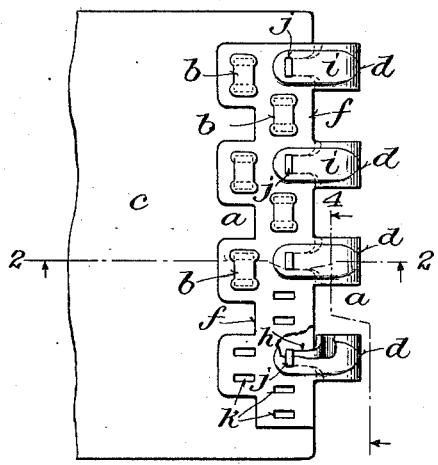
Figure 5:
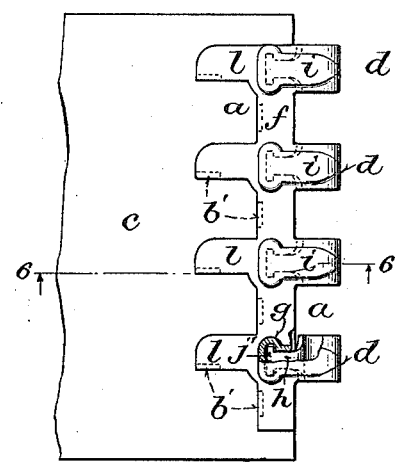
Figure 2:
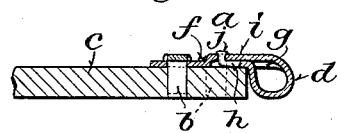
Figure 6:
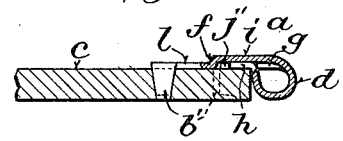
Figure 3:
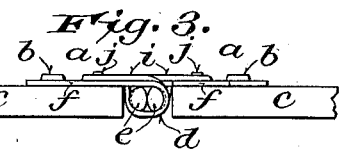
Figure 7:
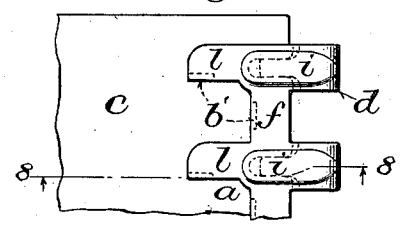
Figure 4:
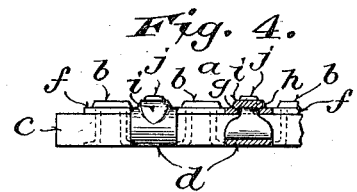

Figure 1 is a plan view of one form of fastening member embodying the invention as applied to a belt end; Fig. 2 is a section on the line 2—2, Fig. 1, lengthwise of the belt; Fig. 3 is an end elevation of a complete fastening comprising two members like that shown in Figs. 1 and 2, as applied to a belt and connected by a sectional rocker hinge pin; Fig. 4 is a view partly in elevation and partly in section on the line 4—4, Fig. 1; Fig. 5 is a plan view of a modified construction of a part of the fastening; Fig. 6 is a section on the line 6—6, Fig. 5, lengthwise of the belt; Fig. 7 is a partial plan view showing another modification of the fastening; and Fig. 8 is a section thereof on the line 8—8, Fig. 7.

Referring to Figs. 1, 2, 3 and 4, the complete fastening comprises two members $a$, secured by staples $b$, to the outer faces of belt ends $c$ and formed at intervals with loops $d$, and a hinge pin $e$ fitting in said loops and detachably connecting the members $a$, as shown in Fig. 3. The members $a$ are made of sheet metal, preferably steel, and each comprises a cross bar or plate $f$ along one edge of which the hinge loops $d$ are integrally formed. The cross bar $f$ is formed on the inner side, as shown in Figs. 2 and 4, with recessed seats $g$, to receive and hold the backwardly folded ends or tongues $h$ of the loops $d$. These seats are formed by pressing or forcing the sheet metal of which the member $a$ is made, outwardly, and extend into the proximate ends of the loops $d$, thereby producing on the outer side of the fastening member, ribs or protuberances $i$, which reinforce and strengthen the hinge loops where they are subjected to the greatest strain. The backwardly folded ends or tongues $h$ of the hinge loops are preferably made, as shown in Figs. 1 and 4, of less width than the outer sides of the loops, and to insure against their withdrawal from the seats $g$ by the strain on the belt to which the loops are subjected, they may be bent outwardly at their extremities through apertures in the cross bar $f$, and headed or riveted on the outer side thereof, as shown at $j$, particularly in Fig. 2. The ends or tongues $h$ of the loops, which fit into the seats $g$ approximately flush with the inner face of the cross bar $f$, are clamped with the cross bar to the belt end and are thus held in place, so that the headed or riveted terminals or other provision for securing the loop ends or tongues $h$ in the seats $g$, may be omitted, as shown in Figs. 7 and 8. For securing the member $a$ to a belt end and clamping the backwardly folded loop ends or tongues $h$ between the cross bar $f$ and the belt end, the cross bar may be formed with holes $k$, elongated lengthwise of the belt and arranged in pairs and in one or more rows crosswise of the belt, for the staples $b$, which have flat clenchable prongs and heads expanded or extended to bear against the outer face of the cross piece around said holes. The inner pointed ends of the staples are clenched in the inner side of the belt and present little or no metal contact to the pulleys on which the belt runs.

Referring to Figs. 5 and 6, showing a modification of the fastening, the cross bar $f$ of the member $a$ is formed integrally with pointed clenchable prongs $b'$ for securing it to a belt, some of the prongs being formed on the sides of arms $l$ of the cross bar, and others on the edge of the cross bar itself between said arms on the opposite side from the hinge loops $d$. Those on the arms $l$ are disposed flatwise in the direction of the length of the belt, and those on the cross bar itself in the direction of the width of the belt. The backwardly folded ends or tongues $h$ of the hinge loops terminate in cross heads $j'$ which interlock with lateral enlargements of the seats $g$, to prevent the withdrawal of the loop ends or tongues from said seats and the straightening of the loops. In other respects the fastening is essentially like that shown in the preceding figures.

Figure 8:
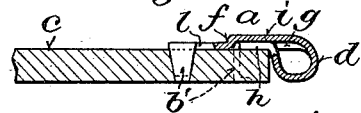

Referring to Figs. 7 and 8, showing another modification, the backwardly bent ends or tongues $h$ of the hinge loops are not bent, headed or riveted to interlock with holes in the cross bar or lateral enlargements of the seats $g$, as shown in the other figures, but are simply clamped with the cross bar to the belt end. In other respects this form of the fastening is essentially like that shown in Figs. 5 and 6.

Any of the three forms of loop ends or tongues $h$ and corresponding seats $g$ may be used with either of the two forms of the cross bar $f$ and fastenings for attaching the same to a belt, herein shown and described.

The hinge loops are preferably somewhat elongated lengthwise of the belt, and the two members $a$ of the fastening are detachably connected preferably by a loose hinge pin $e$, composed of two parts or segments adapted to roll or rock against each other on their inner faces without turning on their outer faces in the loops $d$, against which they bear. A hinge pin of any other suitable form or kind may however, be used, and no claim *per se* to the preferred form shown and mentioned in this connection is herein made, as it is the subject matter of another application, Serial No. 730,555, filed November 11, 1912.

While the fastening as herein shown and described is suitable for belting used for various purposes, it is specially useful in connection with axle driven electric generators for car lighting, where comparatively short belts running on pulleys of small diameter are employed, and being exposed to extreme atmospheric changes and subjected to hard usage, have to be frequently renewed or shortened to take up slack, resulting from the exposure and stretching incident to such hard usage.

Various changes in the minor details of construction of the device may be made without departing from the principle and scope of the invention as defined in the following claims.

I claim:

1. A belt fastening comprising a metal member having a cross bar for attachment to the outer face of a belt end formed with hinge loops and with recessed seats to receive and hold the backwardly folded ends of the loops.

2. A belt fastening comprising a metal member having a cross bar formed at intervals along one edge with hinge loops and on the inner side with recessed seats extending into the proximate ends of the loops and forming reinforcements thereof, the extreme ends of the loops forming tongues which are folded back into said recessed seats approximately flush with the inner face of the cross bar.

3. A belt fastening comprising a metal member having a cross bar provided with means for attachment to the outer face of a belt end and formed with hinge loops and with recessed seats to receive and hold the backwardly folded ends of the loops which are interlocked with the cross bar.

4. A belt fastening comprising a metal member having a cross bar formed at intervals along one edge with hinge loops and on the inner side with recessed seats to receive the backwardly folded ends of the loops which are bent outwardly into engagement with openings in the cross bar.

In witness whereof I hereto affix my signature in presence of two witnesses.

GEORGE E. PURPLE.

Witnesses:
  ALBERT B. BEACH,
  P. S. RINALDO.

Copies of this patent may be obtained for five cents each, by addressing the "Commissioner of Patents, Washington, D. C."